United States Patent [19]

Bishop

[11] 4,198,632
[45] Apr. 15, 1980

[54] TRANSPONDER REPLY LIMITING BY MEANS OF RECOGNITION OF FIXED INTERROGATION PERIODS

[75] Inventor: Walton B. Bishop, Oxon Hill, Md.

[73] Assignee: The United States of America as represented by the Secretary of the Navy, Washington, D.C.

[21] Appl. No.: 151,973

[22] Filed: Jun. 10, 1971

[51] Int. Cl.² .............................................. G01S 9/56
[52] U.S. Cl. ............................................. 343/6.8 LC
[58] Field of Search ....................... 343/6.8 LC, 6.8 R

[56] References Cited

U.S. PATENT DOCUMENTS

| | | | |
|---|---|---|---|
| 2,777,059 | 1/1957 | Stites | 343/6.8 R |
| 2,821,705 | 1/1958 | Wachtell | 343/6.8 R |
| 3,054,103 | 9/1962 | DeFaymoreau | 343/6.8 R |
| 3,187,258 | 6/1965 | Zolnik | 343/6.8 R |
| 3,241,137 | 3/1966 | Smoll | 343/6.8 R |
| 3,508,260 | 4/1970 | Stein | 343/6.8 LC |

OTHER PUBLICATIONS

Skolnik, *Radar Handbook*, McGraw—Hill, 1970, pp. 38-4 and 38-6.

*Primary Examiner*—T. H. Tubbesing
*Attorney, Agent, or Firm*—R. S. Sciascia; Philip Schneider; Sol Sheinbein

[57] ABSTRACT

It is shown that the interrogation repetition period (IRP) of an interrogator can be recognized by a transponder and then used by it to both determine when the interrogator has elicited a predetermined number of replies called an adequate response and limit the interrogator to that number during each scan. This form of reply limiting by a transponder requires absolutely no change in the type of signals transmitted. Logic circuits that perform the required functions are provided.

2 Claims, 11 Drawing Figures

TRANSPONDER REPLY LIMITING BY MEANS OF RECOGNITION OF FIXED INTERROGATION PERIODS

STATEMENT OF GOVERNMENT INTEREST

The invention described herein may be manufactured and used by or for the Government of the United States of America for governmental purposes without the payment of any royalities thereon or therefor.

BACKGROUND OF THE INVENTION

Most radar-beacon interrogators operate on preassigned interrogation-repetition frequencies. These frequencies are chosen so that interference among interrogators that are geographically capable of interrogating the same transponder simultaneously will not be excessive. When more than a few interrogators are operating in the same geographic area, interrogation-repetition-frequency (IRF) assignments must be made carefully, and the interrogators must maintain precise control over their interrogation rates.

It is no longer essential that a radar-beacon, or secondary radar, system be interconnected with a primary radar system. In fact, many of today's radar-beacon systems operate independently of primary radar, and in some cases the radar-beacon system has completely replaced the primary radar. Thus, whether the primary radar system operates at a fixed pulse-repetition-frequency or uses prf jittering, the radar-beacon system associated with it can operate at any desired IRF, and this frequency can be crystal controlled if desired.

A radar beacon system operates on the master-slave principle. The interrogator, as master, demands replies. The transponder, as slave, replies dutifully unless prevented from doing so by circumstances beyond its control. As in any master-slave situation, difficulties arise when two or more masters make conflicting demands upon the same slave. At present most interrogators demand far more replies from most transponders than they really need, or should really need if proper use were made of replies received. Why radar-beacon users insist on continuing to use high interrogation-repetition rates is easy to understand. To provide safe air traffic control the controllers must receive a sufficient number of replies from all transponders within range, not just from those which happen to receive excessive interrogations. If interrogation repetition frequencies were reduced so that nearby transponders would receive only as many interrogations as needed, then some of the more distant transponders would most certainly not receive enough. Since each interrogation may be received by both nearby and distant transponders, there is no way for the interrogator to reduce interrogation rates enough to prevent many, in fact most, transponders from receiving far more interrogations than necessary.

However, if it can be determined how many replies each interrogator actually needs from a transponder during each scan of its antenna past that transponder, and the transponder can recognize the source of each sequence of interrogations, then the transponder can be made to limit its replies so that no interrogator can obtain more than the number of replies it needs. The number of replies actually needed per scan past a transponder is called an adequate response, and reply limiting that permits this number but only this number to each interrogator, is reply limiting based on the adequate response principle.

A transponder might recognize interrogators in several ways. Military users of radar beacon systems have been concerned for some time about how to recognize friendly interrogators versus enemy ones, so that transponders could be made to reply only to the former. During World War II, and in every conflict since, transponders have been turned off in certain areas, so that enemy interrogators could not get replies from them. The separation of interrogators into those that are friendly and those that are not, although useful for other purposes, does nothing to reduce the number of replies each of our transponders must transmit every time a friendly interrogator's antenna sweeps past it.

If every interrogator had its own personal identification code, such as every military transponder now has, then transponders might use this code to determine when each interrogator had elicited and adequate number of replies. The interrogator personal identification (IPI) code would, of course, have to be transmitted with every interrogation. There are a number of ways in which IPI codes might be used for reply limiting, and they offer some unique capabilities in other areas.

If the interrogation repetition periods of interrogations received are recognized by a transponder and this information is then used to limit replies, the adequate-response type of reply limiting is possible without increasing the interrogation length or frequency spectrum used by interrogations.

SUMMARY OF THE INVENTION

The present invention overcomes the deficiencies of prior reply limiters by providing a radar-beacon transponder that recognizes the fixed interrogation repetition periods of interrogators and makes use of such recognitions to assure that each interrogator receives an adequate number of replies but no more than that number. Logic circuits that perform the required functions are provided.

OBJECTS OF THE INVENTION

It is therefore an object of the present invention to provide an improved IFF reply limiting technique.

Another object of the present invention is to provide an IFF reply limiting technique that requires no change in the type of signals transmitted nor an increase in the size of the frequency spectrum used.

Yet another object of the present invention is to provide an IFF system having an improved reliability with greater resistance to jamming.

A still further object of the present invention is to provide an improved IFF transponder that emits sufficient replies to interrogators yet limits its replies so that no interrogator obtains more than the number of replies it needs.

A still further object of the present invention is to provide an improved IFF system designed to increase air traffic capacity and reduce the number of unsynchronized replies (fruit) received during each scan.

Another object of the present invention is to provide an IFF transponder that distinguishes between different interrogators.

Further objects and advantages of the present invention will become readily apparent to those skilled in the art from a further reading of the present specification and claims, particularly when viewed in the light of the drawings, in which:

DESCRIPTION OF THE PREFERRED EMBODIMENT

Ideally, interrogation repetition frequencies should be so selected and their change, or drift, during operation so controlled that synchronous interference between any pair of interrogators is impossible. Gardner (in NRL Report 7071 dated June 11, 1970, titled Methods for Calculating and Analyzing IRF Sets Nonsynchronous for n Interrogations) has shown a convenient way of selecting IRFs so that when interference between any pair of interrogators does occur at a transponder, such interference cannot occur again for at least n repetition periods of the two interrogators involved. The interrogation repetition periods (IRPs) associated with the nonsynchronous resulting when Gardner's method of selection is used are ideally suited for the reply-limiting technique about to be described. The fact that the use of such IRPs is a sufficient condition, however, does not imply that it is a necessary one. It is necessary only that the interrogators within range of each transponder operate at different IRF's or the same IRF at different phases. Assuming for convenience that the IRFs are such that all IRPs differ by at least 1 microsecond, means that radar-beacon interrogators operating with IRFs between 100 and 450 interrogations per second (ips) must have IRFs differing by at least 0.01 ips at the low end of this range or by at least 0.16 ips at the high end.

Figure 1:
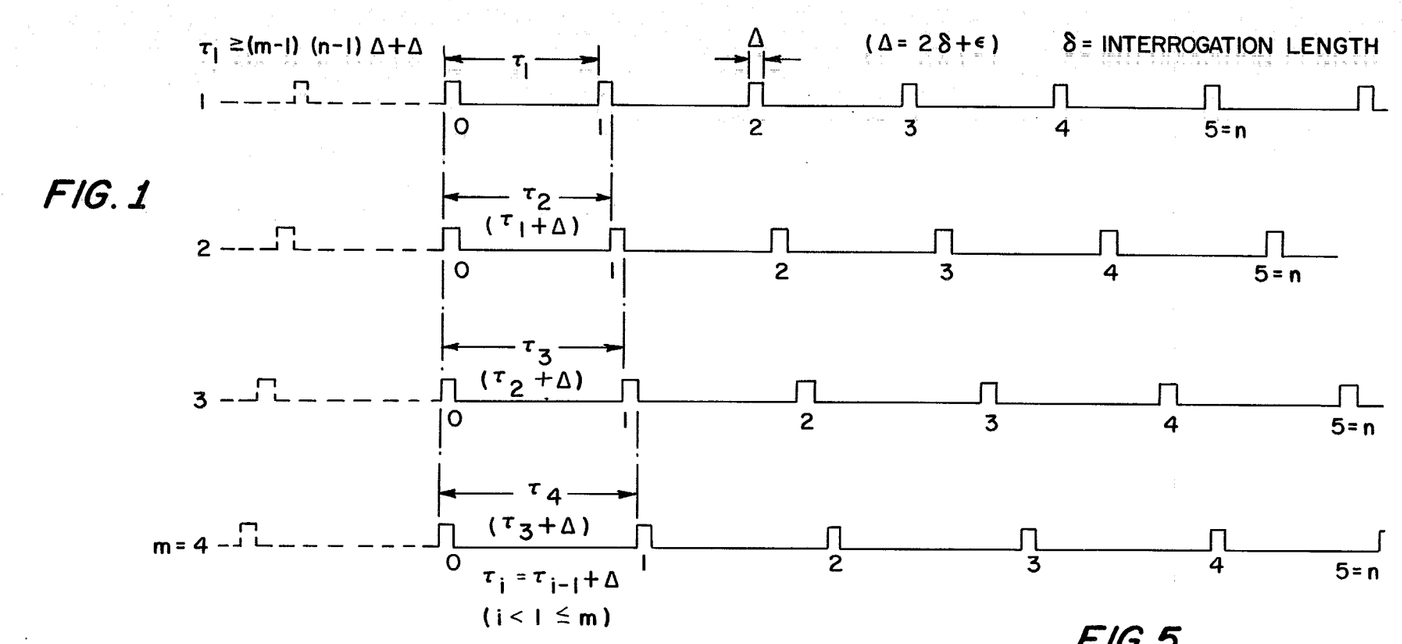
FIG. 1 illustrates different pulse repetition periods of various interrogators.

FIG. 1 illustrates a simple way of selecting IRFs so that they will be suitable for use with the fixed-interrogation-repetition-period method of reply limiting. In this figure, $$\Delta = 2\delta + \epsilon$$

where $\delta$ is the time between arrival of two interrogations required for decoding of both at a transponder (the interrogation length), $\epsilon$ is an arbitrarily small positive number, and $\tau_i$ is the interrogation repetition period. In general, $$\tau_i = \tau_{i-1} + \Delta (1 < i \leq m)$$

where m is the number of IRFs assigned and $$\tau_1 \geq (m-1)(n-1)\Delta + \Delta$$

where n is the number of interrogations that a transponder should accept from each interrogator during a single scan of that interrogator's antenna past the transponder.

In FIG. 1, m=4 and n=5. Thus, $$\tau_1 = (3)(4)\Delta + \Delta = 13\Delta$$

and $$\tau_4 = 16\Delta.$$

Proof that this method of selecting IRFs will produce nonsynchronous ones follows immediately from that given in NRL Memorandum Report 2078, dated January 1970 by Walton B. Bishop, "On the Reduction of Interference Between Two Sequences of Events". Note that here, the concern is with two-way or mutual, interference; so the $\delta$ of the aforementioned memorandum has been replaced by $\Delta = 2\delta + \epsilon$. It should also be noted that this simple method of selecting IRFs is not inconsistent with the method developed by Gardner. It represents a simple variation of his method, valid when the time during which interference can occur is small. This time becomes exceedingly small ($\approx 2$ $\mu$sec) for SIF (Selective Identification Feature) of the Mark XII IFF system. Similar interrogations are used by the civil Air Traffic Control Radar Beacon System (ATCRBS) interrogations, because interleaved pairs of pulses can easily be recognized by a decoder. The reply-limiting technique based upon recognition of interrogation repetition periods is not concerned with the fact that some interrogations elicit no responses because the transponder has not recovered from answering a previous interrogation. A new type of reply-limiting will automatically become more important, however, if the transponder dead times following transmission of a reply and/or following reception of an interrogation-side-lobe-suppression (ISLS) signal are reduced.

Figure 2:
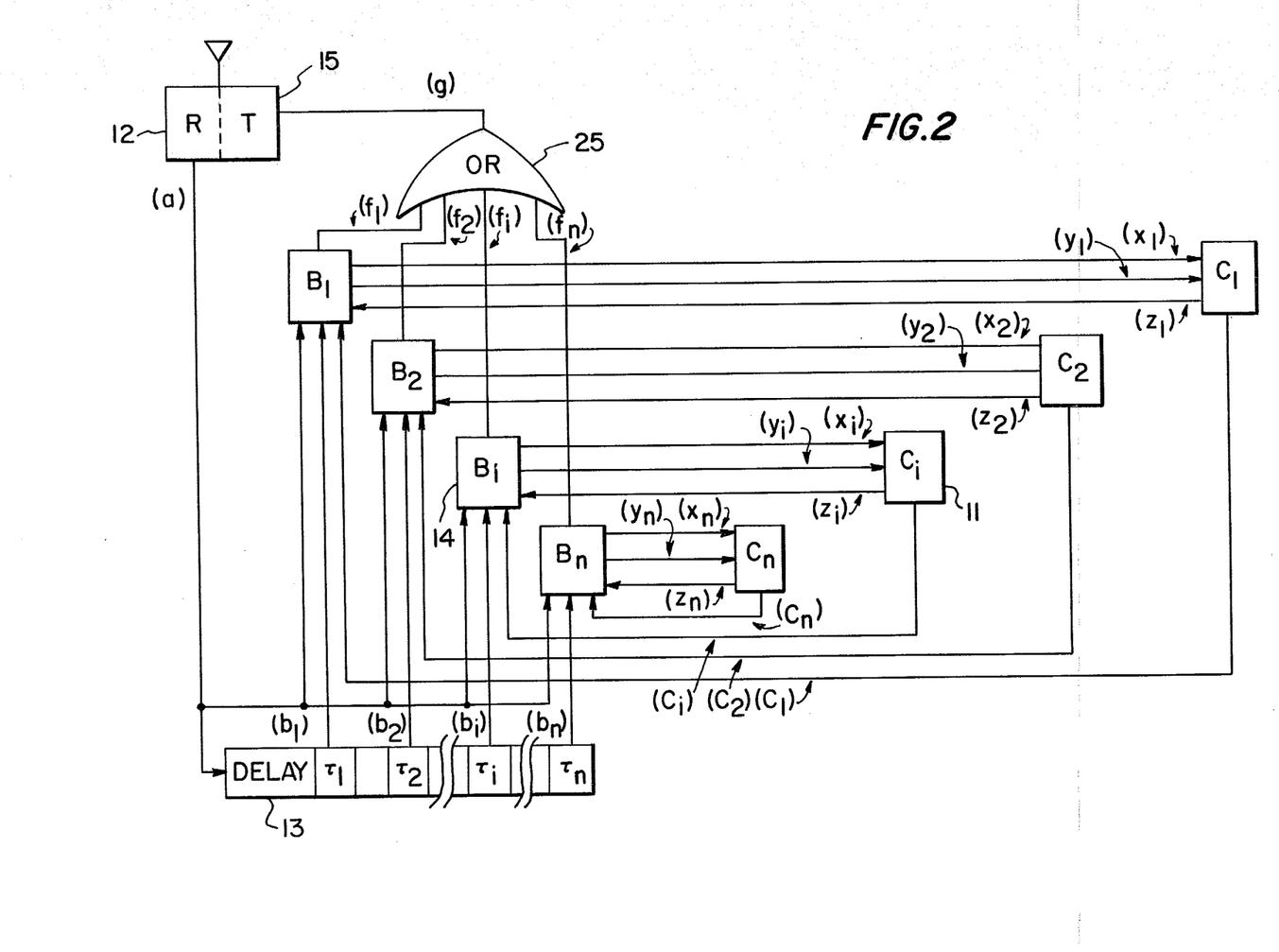
FIG. 2 is a block diagram representation of the reply limiter of the present invention.
Figure 3:
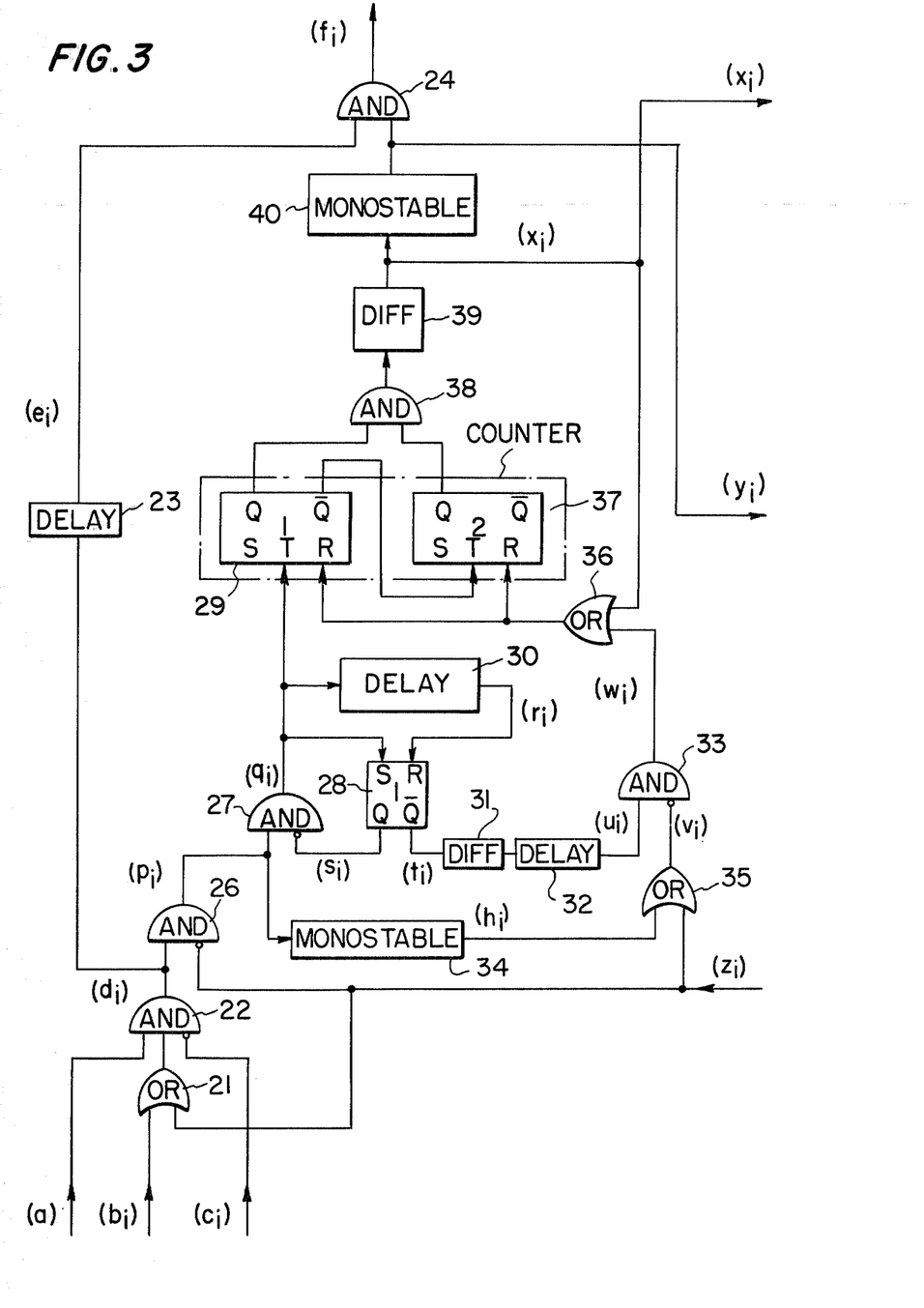
FIG. 3 is a block diagram representation of an exemplary logic circuit of the interrogator sample selector.
Figure 4:
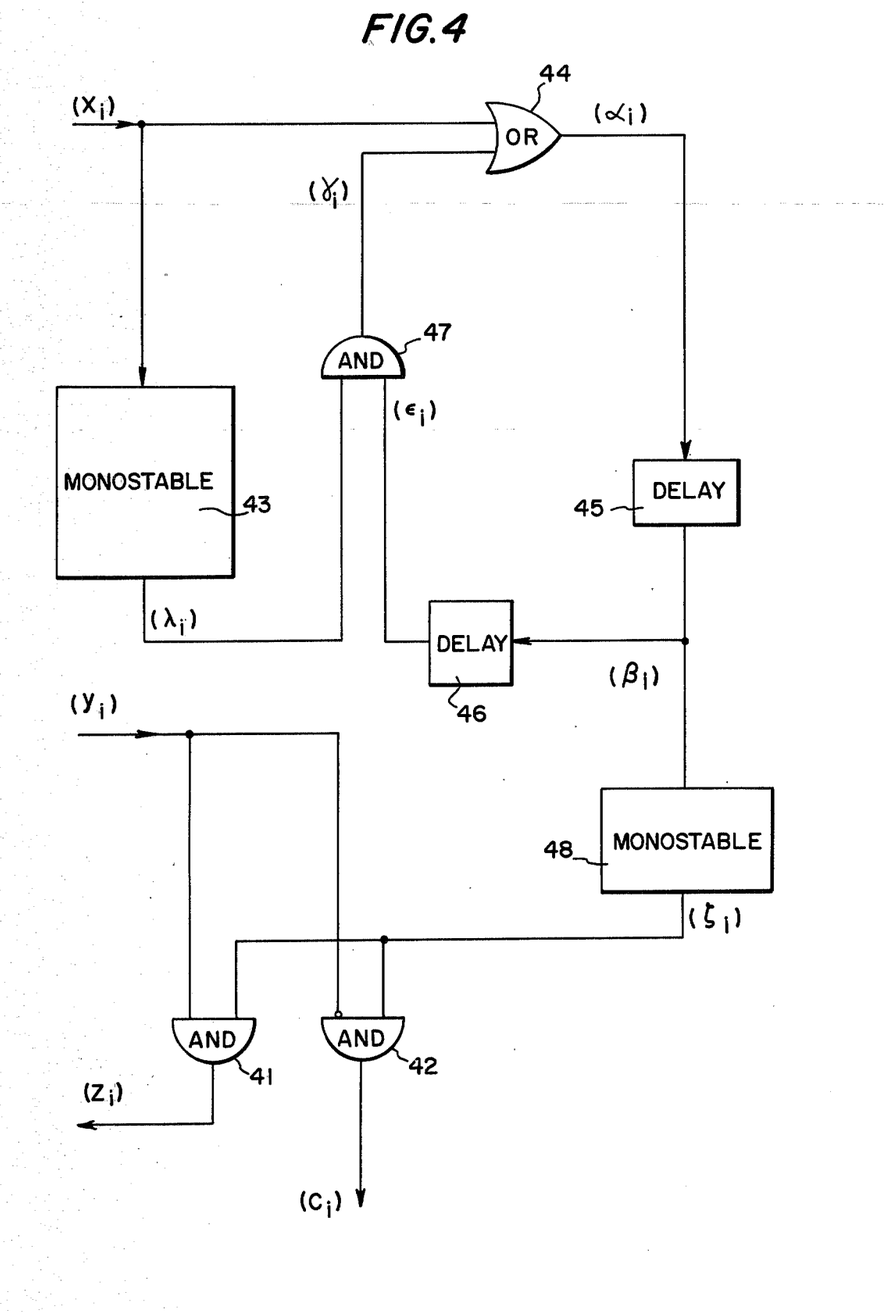
FIG. 4 is a block diagram representation of an exemplary logic circuit of the excess-interrogation suppressor.

The logic circuits shown in FIGS. 2 through 4 show only that the recognition-of-fixed-interrogation-repetition-period (ROFIRP) method of reply limiting is indeed possible.

REPLY LIMITER

FIG. 2 shows a block diagram of the ROFIRP reply limiter. Its operation may be summarized as follows:

1. Reply triggers (a) from the transponder receiver 12 go to the delay circuit 13 and the interrogation sample selectors $B_i$ 14 where $i = 1, 2, \ldots n$.

2. The delay circuit 13 produces output pulses $(b_1)$, $(b_2) \ldots, (b_i), \ldots, (b_n)$ just $\tau_1, \tau_2, \ldots, \tau_i, \ldots, \tau_n$ microseconds respectively after each reply trigger (a) enters. The periods $\tau_i$ represent the IRPs assigned to interrogators. For convenience assume only that $\tau_i - \tau_j \geq 1$ $\mu$sec for all i, j.

3. The pulses $(b_i)$ are used by the sample selectors $B_i$ 14 to determine:

a. When replies should commence and when they should stop, i.e., the sample of interrogations that should elicit replies. Circuit $B_i$ 14 then generates pulses $(f_i)$ to trigger appropriate replies.

b. A sample gate $(y_i)$ that can be used by the excess interrogation suppressor $C_i$ 11 to reject interrogations after an adequate number from each source have been answered.

c. Special gate-triggering pulses $(x_i)$ for uses to be explained later.

4. The excess-interrogation suppressor $C_i$ 11 produces appropriately timed trigger-reject gates $(c_i)$ and $(z_i)$ for the interrogation sample selector $B_i$ 14.

INTERROGATION SAMPLE SELECTOR

Operation of the interrogation sample selector $B_i$ 14 shown in FIG. 3 and the excess-interrogation suppressor $C_i$ 11 shown in FIG. 4 can best be explained by describing the waveforms throughout their circuits. Idealized waveforms for all of these circuits are shown in FIGS. 5 through 11. The delays $\delta_1$, $\delta_2$, and $\delta_3$ shown in FIGS. 6 through 10 have been exaggerated for clarity. Actually, the ratio $\delta_j/\tau_i$ (where $j=1, 2, 3$) is so small that no $\delta_j$ would show in the figures if they were drawn to the same scale as $\tau_i$.

Figure 5:
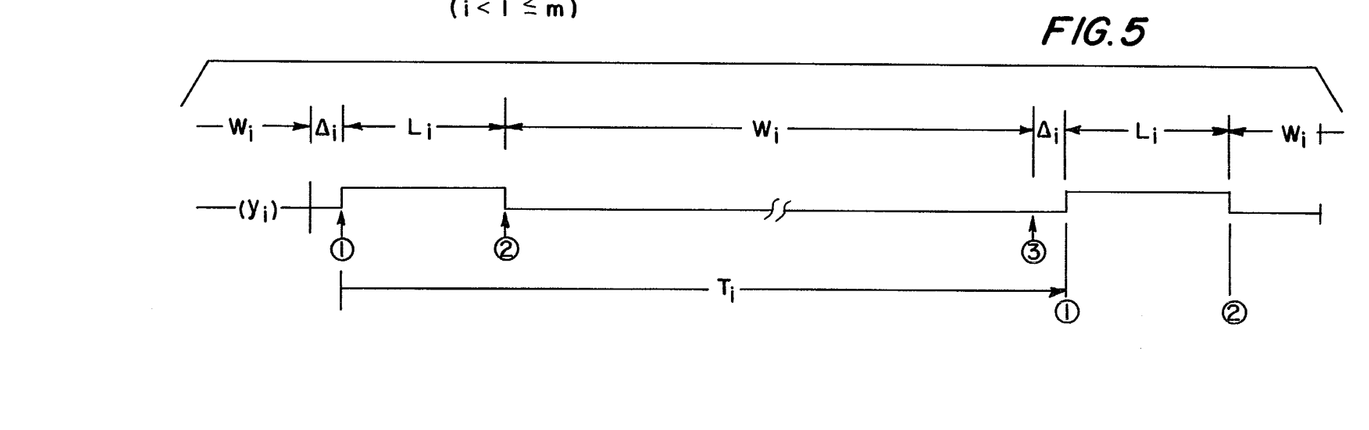
FIG 5 illustrates the waveforms of the operation of the reply limiter.

It is convenient to start the explanation of circuit operation by describing precisely a waveform that represents one of the main objectives of the ROFIRP reply limiter: Referring now to FIG. 5, the waveform $(y_i)$ indicates by the gate $L_i$ the length of time that replies should be given to an interrogator and by $W_i$ the length of time that they should be denied it. Usually, $L_i$ will be somewhat shorter than the length of time an interrogator's antenna looks at a transponder, and $W_i$ will be a litte less than the time between looks. The interval $\Delta_i$ allows for the fact that interrogator antenna rotation rates are not all exactly the same. For all values of i, $$L_i + W_i + \Delta_i = T_i,$$

where $T_i$ is the interrogator antenna's rotation period or the interrogator's scanning period.

Timing reference points ① and ② are the beginning and the end, respectively, of gate $L_i$, with point ③ marking the end of $W_i$ occasionally. For convenience it is assumed that 20 replies to an interrogator constitutes an adequate response. Consequently, the illustrations show the sample size S equal to 20.

Figure 6:
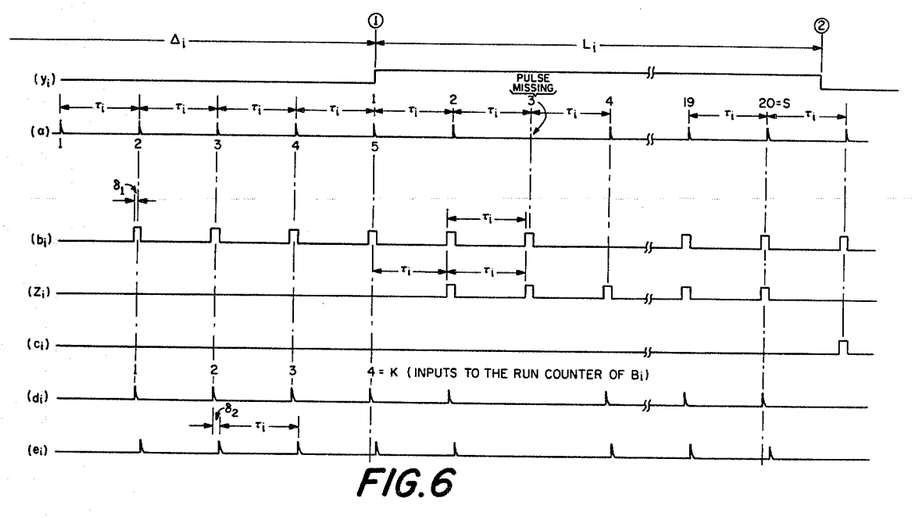
FIG. 6 thru 11 illustrate the waveforms present at different points throughout the circuits found in FIGS. 3 and 4.

The waveform $(y_i)$ at the top of FIG. 6 serves as a convenient timing reference. From examination of waveform (a), it is observed that four reply triggers from the transponder receive 12 occur before the first one is allowed to elicit a reply from transmitter 15, i.e., before one appears within the reply-trigger gate $L_i$. The de Moivre run-of-k type decision function was chosen for determining when the leading edge of an interrogator's main antenna beam reaches the transponder ($k=4$ in the Figures). Other decision functions could be used equally well. This particular choice, actually a run of five reply triggers, should help move the sample of interrogations selected to be answered toward the middle of the interrogator antenna main beam.

A narrow gate $(b_i)$ starts $\tau_i - \delta_1$ microseconds after each reply trigger (a) enters delay 13. The fact that the outputs from delay 13 are gates rather than pulses implies that a monostable switch, or the equivalent, is included in delay 13 for each of its outputs.

Referring now to FIG. 3, the output gates $(b_i)$ from delay 13 pass through OR gate 21 to AND gate 22. The inhibiting input $(c_i)$ to AND gate 22, as will be explained later, is present only after an adequate number of replies have been given. Each time two reply triggers (a) from receiver 12 are separated by $\tau$ microseconds, the first will provide an input gate $(b_i)$ to AND gate 22 at the same time that the second provides a direct pulse input to AND gate 22. When this occurs, and only when this occurs, a pulse will pass through AND gate 22 to produce waveform $(d_i)$ (provided, of course, that no inhibiting pulse $(c_i)$ is also supplied to AND gate 22).

Pulses $(d_i)$ are delayed a fraction of a microsecond $\tau_2$ by delay 23 produce pulses $(e_i)$ which are then applied to AND gate 24. If four $(e_i)$ pulses separated by $\tau_1$ microseconds occur in succession, the fourth will be allowed to pass through AND gate 24 because $\tau_2$ microseconds before the fourth successive $(e_i)$ pulse the gate $L_i$ of waveform $(y_i)$ starts (as will be explained further on). The gate $L_i$ remains on for a predetermined length of time calculated to allow an adequate number of $(e_i)$ pulses to pass through AND gate 24 and thus go on through OR gate 25 to become the reply triggers (g) entering the transponder transmitter 15 (FIG. 2).

Circuit $B_i$ 14 determines the beginning and end of gate $L_i$ thusly: Each input pulse $(d_i)$ is applied to AND gate 26. The inhibiting gates $(z_i)$ start appearing $\tau_1$ microseconds after gate $L_i$ has started (reference point ①), and they stop appearing as soon as the gate $L_i$ ends (reference point ②). Thus, the first $(d_i)$ pulse that appears will pass through AND gate 26. The first output pulse $(p_i)$ from AND gate 26 will pass through AND gate 27, for the bistable switch RS-1 28 will be in the reset position at that time, and hence will not provide an inhibiting input to AND gate 27 (see waveform $(s_i)$). The pulses $(q_i)$ accomplish three things:

1. Each $(q_i)$ pulse triggers RST-1 29 to start or add one to the run count.

2. Each $(q_i)$ pulse sets RS-1 28, thus switching its output from $\overline{Q}$ to Q (see waveforms $(s_i)$ and $(t_i)$).

3. Each $(q_i)$ pulse an input to delay circuit 30.

The output $(r_i)$ from delay 30 occurs a fraction of a microsecond $(\delta_1)$ less than $\tau_1$ microseconds after each $(q_i)$ pulse enters delay 30. This output resets RS-1 28 so that the inhibiting input will be removed from AND gate 27. It also provides a sharp increase in the voltage applied to the differentiating circuit 31 (see waveform $(t_i)$, which causes a pulse to pass through delay 32 and thus appear as a pulse $(u_i)$ at AND gate 33. The delay of $\delta_3$ microseconds produced by delay 32 is approximately twice as long as the delay $\delta_1$ (FIG. 7).

The $(p_i)$ pulses coming from AND gate 26 cause the monostable switch 34 to produce a series of gates $(h_i)$ that pass through OR gate 35 to inhibit the pulses $(u_i)$ that would otherwise pass through AND gate 33 and OR gate 36 to reset the counter 37 to zero. Note in FIG. 7 that the $(h_i)$ gates stop as soon as the timing reference point ① is reached. However, a $(u_i)$ pulse occurs approximately $\tau_i$ microseconds after this point, i.e., after the gate $L_i$ starts. The succeeding gates in waveform $(v_i)$ are supplied by waveform $(z_i)$, which (FIG. 8) starts providing positive gates at precisely this time. For non-military use the output of monostable switch 34 may be connected directly to the inhibiting input to AND gate 33, the output of AND gate 33 may be connected directly to the reset terminals of the counter 37 and both OR gate 35 and OR gate 36 may be removed.

Figure 7:
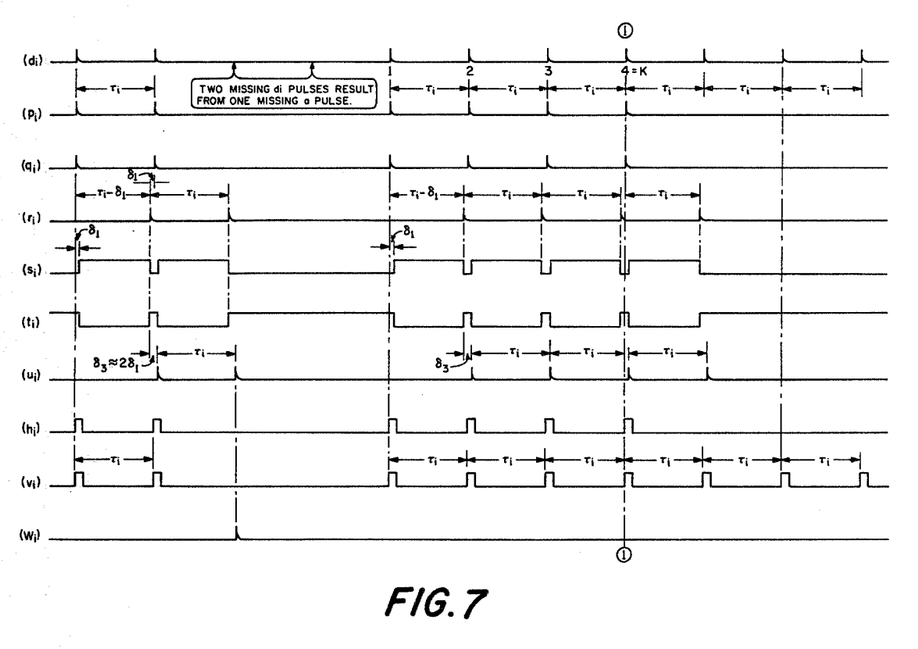

FIG. 7 illustrates the fact that if a $(p_i)$ pulse is missing from its appropriate position $\tau_i$ microseconds after the previous one while the run count is being made, then the corresponding $(h_i) \rightarrow (v_i)$ gate will be missing too, so that a $(u_i)$ pulse will be allowed to pass through AND gate 33 and reset the counter 37. The fact that one missing (a) pulse produces two successive missing $(p_i)$ pulses is due to the manner in which AND gate 22 requires both a delayed $(b_i)$ and a direct (a) input to produce an output $(d_i)$, which of course produces the pulses $(p_i)$. Consequently, in general, m missing (a) pulses in succession result in $m+1$ missing $(d_i)$ pulses in succession until a run count of k is reached. It is important to note that reduction in trigger outputs does not occur after the first reply has been elicited. During the interval $L_i$, as will be obvious later, every (a) pulse having the appropriate will elicit a reply.

In summary, the counter 37 counts successive pulses ($q_i$) if, and only if, they are spaced $\tau_i$ microseconds apart. When a count of four is reached, both inputs to AND gate 38 become high; so a sharp increase in voltage is applied to differentiating circuit 39. The output of differentiator 39, the pulse shown in waveform ($x_i$), at reference point ① produces the start of gate $L_i$.

Circuit 40 might be designed in several ways. Its purpose is to use the pulse ($x_i$) to generate the gate $L_i$, which must be maintained just long enough to allow an adequate number of replies to be made at the repetition period $\tau_i$. If 20 replies constitutes an adequate response to any interrogator, then circuit 40 is designed so that $$20\tau_i < L_i < 21\tau_i.$$

Since $L_i$ always starts precisely with the first reply made to the interrogator, and very little harm is done if 21 instead of 20 replies are transmitted to an interrogator, $L_i$ does not really have to be very precise. Consequently a rather simple monostable switch can provide sufficient accuracy for determining when $L_i$ should end. A very precise delay circuit of length $\tau_i$ with a feedback loop and a counter could also be used for determining $L_i$ but is certainly not necessary for ROFIRP reply limiting. It may be noted that a delay circuit of the proper type with a feedback loop is included in the excess-interrogation suppressor (circuit $C_i$). This feedback circuit could be used in place of the monostable switch 40, if an additional counter and a bit of additional logic circuitry were provided.

A special feature of monostable 40 primarily to help in overcoming jamming is required since if a second ($x_i$) pulse enters monostable 40 before the gate $L_i$ ends, monostable 40 must extend to the gate $L_i$ so that the interrogator which produced the second ($x_i$) pulse will be allowed to elicit an adequate response.

The pulse ($x_i$) that produces the leading edge of gate $L_i$ also goes through OR gate 36 to reset the counter 37 to zero and to the excess-interrogation suppressor (circuit $C_i$ 11). Letting the pulse ($x_i$) reset the counter instead of allowing the final ($u_i$) pulse to do it serves only to get the counter reset $\tau_i$ microseconds sooner. This $\tau_i$ microseconds delay would be of no consequence in nonmilitary systems, but it might be important in a military system, since an enemy might be transmitting interrogations at the IRP of $\tau_i$ at the same time that we wished to do so.

The gate $L_i$, as stated earlier, provides one input to AND gate 24 so that the pulse which caused the count of four in the counter 39 (since it is delayed slightly in passing through delay 23) and all succeeding ($e_i$) pulses for the duration of $L_i$ will pass through AND gate 24. The gate $L_i$ is also applied to AND gate 41 and AND gate 42 in circuit $C_i$ 11. The output of AND gate 41, the waveform ($z_i$) is applied back to AND gate 26, OR gate 21 and OR gate 35, in circuit $B_i$ 14. This waveform ($z_i$) consists of narrow positive gates so timed that they will coincide with succeeding (a) pulses from the transponder receiver 12 that result from interrogations arriving at an IRP of $\tau_i$ microseconds, and the same phase as those that caused the run count of four.

The ($z_i$) gates perform three functions:

1. They permit all reply triggers occurring n$\tau_i$ microseconds after reference point ①), where n is an integer and n$\tau_i$<$L_i$, to pass through AND gate 22. (As mentioned earlier shown in FIGS. 6 and 10, no inhibiting gates ($c_i$) are applied to AND gate 22 at this time.)

2. They inhibit AND gate 26 so that no further ($d_i$) pulses having the same phase and repetition period as the four which produced a run of four and hence started $L_i$ can pass through.

3. They provide inhibiting gates through OR gate 35 to AND gate 33.

It may now be observed that the interrogation sample selector (circuit $B_i$14) can select a second sample almost immediately after a first one has been selected, provided only that the second set of interrogations arrive at a different phase.

EXCESS-INTERROGATION SUPPRESSOR

The excess-interrogation suppressor (circuit $C_i$ 11), shown in FIG. 4, would look the same, in block diagram form, whether it was intended for military or nonmilitary use. The monostable switch 43 for military systems should maintain its positive output for a much longer time than would be needed for nonmilitary systems, however. The nonmilitary users of radar-beacon systems can safely assume that all IRPs will be carefully assigned, that interrogators will always operate at their assigned IRPs, that the number of interrogators that can be within range of a given transponder cannot be large (usually considerably less than 25), and that no one will try to jam the system. The circuits shown in FIGS. 3 and 4 not only include a way of preventing any interrogator from eliciting more than a predetermined number of replies during a scan past the transponder, which usually takes less than 0.2 second, but also include a way of preventing periodic jamming signals that resemble our own interrogations from eliciting more than this same specified number of replies during a time approximately equal to the antenna scanning period, which is usually about 4 seconds for ground or surface based interrogators. Nonperiodic jamming signals that resemble our interrogations cannot trigger replies at all, because they cannot achieve the necessary run of four to start $L_i$. The fact that transponders transmit only a predetermined number of replies to each interrogator also means that our transmitters will be able to operate at higher power and our receivers can be made more sensitive without producing the mutual interference now experienced when this approach is used to overcome jamming.

It is also necessary to consider what the ROFIRP circuits will do when two or more sequences of interrogations having the same IRp but different phases arrive at the transponder. Both an enemy or friendly mobile (ships or aircraft) interrogators may produce them. Circuits $B_i$ 14 and $C_i$ 11 have been designed with this consideration in mind as well as for increased air traffic capacity, permitting eventual use with airborne interrogators.

Referring now to FIG. 4, it should be recalled that pulse ($x_i$) coincides with the leading edge of the gate $L_i$ in waveform ($y_i$) (timing reference point ①), and another ($x_i$) pulse will be produced each time the run counter 37 of circuit $B_i$ 14 reaches a count of four. The extra ($x_i$) pulses would, of course, never be present in a nonmilitary system, where $\gamma_i \neq \tau_j$ for all i, j.

The pulse ($x_i$) coincident with the leading edge of $L_i$ (also therefore with the first reply elicited by the interrogator operating at an IRP of $\tau_i$), goes to two places in $C_i$ 11: it passes through OR gate 44 to the delay circuits 45 (waveform ($\alpha_i$), which is identical to delay 30 in circuit $B_i$ 14, and it goes directly to the monostable switch 43.

Figure 8:
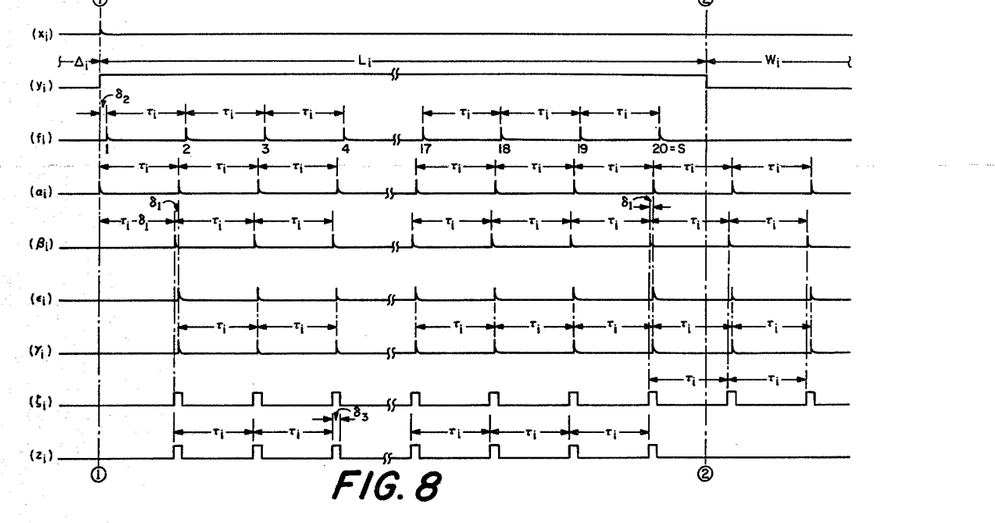
Figure 9:
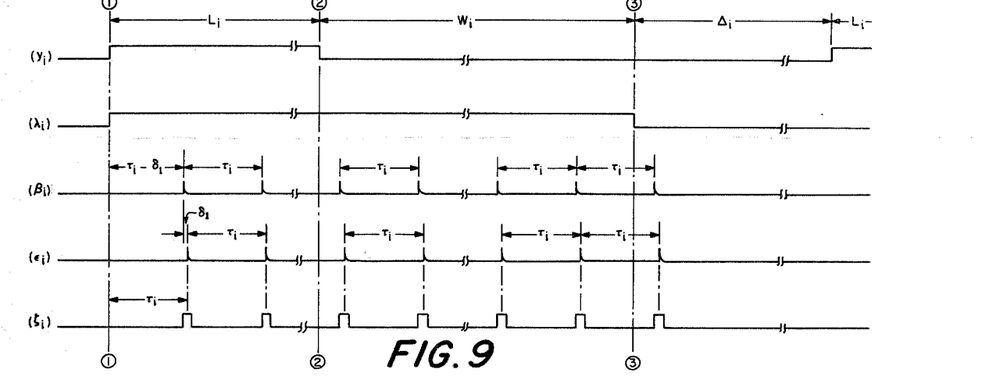

Since the delay produced by delay 45 is equal to $\tau_i - \delta_1$ microseconds, the first $(\beta_i)$ output pulse will occur $\tau_i - \delta_1$ microseconds after the $(\alpha_i)$ pulse (which resulted from $(x_i)$) reaches delay 45 (see $(x_i)$ and the first pulse in waveform $(\beta_i)$ of FIG. 8). The $(\beta_i)$ pulses that pass through delay 46 are delayed a fraction of a microsecond $(\delta_1)$. Thus, each pulse in waveform $(\epsilon_i)$ occurs just $\tau_i$ microseconds after an $(\alpha_i)$ pulse When the $(x_i)$ phase enters monostable 43, it causes a long positive gate to appear at its output (see $(\lambda_i)$ in FIG. 9). This gate provides one input to AND gate 47, so the $(\epsilon_i)$ pulses will pass directly through AND gate 47 until the $(\lambda_i)$ gate ends. Timing reference point ③ marks the end of the $(\lambda_i)$ gate. In military systems this point may be made to occur very close to the next reference point, ①. That is, the $(\lambda_i)$ gate may last throughout most of the time between scans of the interrogator's antenna past a transponder. This means that $\Delta_i$ (FIG. 5) may be very small. In nonmilitary systems, however, where no jamming should be expected, the $(\lambda_i)$ gate should be only large enough to cover the time that the interrogator's antenna takes to scan past a transponder; thus $\Delta_i$ should be large.

The $(\beta_i)$ pulses start occurring $\tau_i - \delta_1$ microseconds after the first reply to a sequence of interrogations arriving at an IRP of $\tau_i$ microseconds is elicited from the transmitter 15 (FIG. 2). The monostable switch 48 produces a narrow gate at its output for each $(\beta_i)$ pulse that enters. These gates, labeled $\xi_i$, are applied simultaneously to AND gate 41 and AND gate 42. Since waveform $(y_i)$ provides the only other input to these AND circuits, AND gate 41 allows the $(\xi_i)$ gates to pass only during the interval $L_i$, and AND gate 42 allows them to pass only when the gate $L_i$ is not present. This means that during the time that the transponder's transmitter is replying at the rate $\tau_i$ the positive gates $(z_i)$ are timed to coincide with the reply triggers (a) and consequently with pulses $(d_i)$ (and the final $(u_i)$ pulse) coming each $\tau_i$ microseconds from the transponder receiver 12. These (a) pulses pass directly through AND gate 22 in circuit $B_i$ 14 because the gate $(z_i)$ passes through OR gate 21 and thus provides an input to AND gate 22 whether one comes from $(b_i)$ or not. And none of the $(d_i)$ pulses that produce reply triggers at $(f_i)$, except the one that starts the $L_i$ gate, is allowed to pass through AND gate 26 because of the inhibiting input $(z_i)$.

Only the first of the $(z_i)$ pulses performs any function in passing through OR gate 35. It inhibits the final $(u_i)$ pulse, which is the only $(u_i)$ pulse occurring at period $\tau_i$ and at the phase of interest that can occur during the interval $L_i$. Thus, the $(z_i)$ gates permit all reply triggers (a) arriving during the interval $L_i$ at the same rate and phase as those which caused the transponder 15 to start replying, to trigger replies, the $(z_1)$ gates prevent any of these triggers from entering the part of $B_i$ 14 which needs to be available for selecting a new sample of interrogations at a different phase, and the first $(z_i)$ gate inhibits the final $(u_i)$ pulse of the series associated with the run count which produced $L_i$, so that the $(u_i)$ pulse cannot set the counter 37 back to zero in case another sequence of triggers has started it counting between the time the $(x_i)$ pulse sets it to zero and the final $(u_i)$ pulse arrives.

Figure 10:
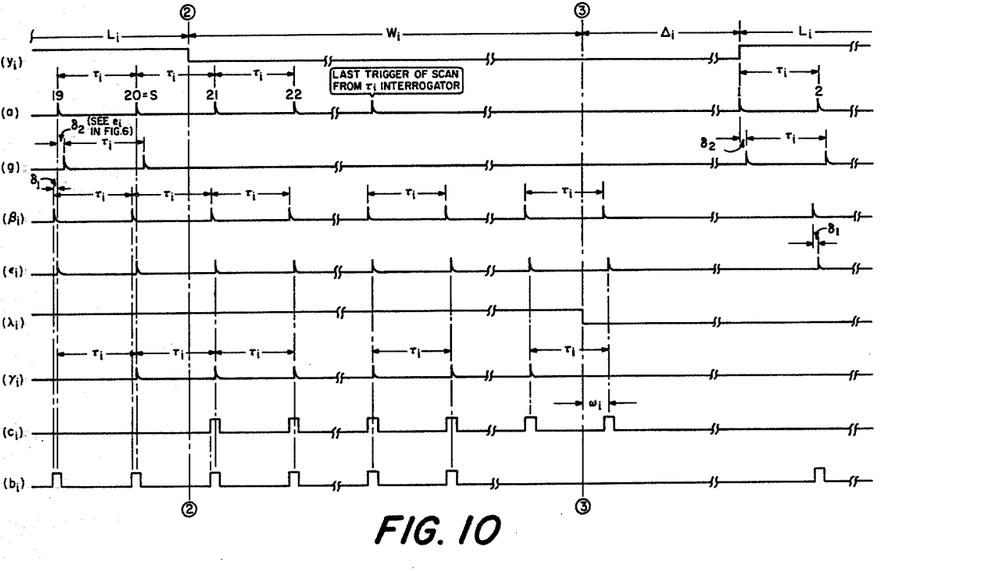

The waveform $(c_i)$ is the one that actually does the ROFIRP reply limiting. This waveform consists of narrow positive gates spaced $\tau_i$ microseconds apart and in phase with the reply triggers that produce replies during the interval $L_i$. However, the gates $(c_i)$ occur only during the interval $W_i + \omega_i$, where $\omega_i \leq \tau_i$ (FIG. 10). Circuit $C_i$ 11 allows $W_i$ to be almost as long as the interval between scans of an interrogator's antenna past a transponder. For nonmilitary uses it needs to be only long enough to cover the portion of a scan (time on target) during which no replies should be given. Thus, for nonmilitary applications, $W_i$ might be less than $L_i$. The gates $(c_i)$ inhibit AND gate 22 at the time that each of the excess interrogations from the interrogator that produced the interrogations at the IRP of $\tau_i$ causes a pulse to reach AND gate 22, provided only that there is no change in phase or IRP of its interrogations.

In considering what happens when two or more $(x_i)$ pulses occur in an interval of time shorter than that required to elicit an adequate response, monostable 40 causes the gate $L_i$ to increase in length each time an $(x_i)$ pulse occurs. This means that when a second $(x_i)$ pulse occurs, it causes the $(z_i)$ gates coming from circuit $C_i$ 11 to continue enabling AND gate 22 at the appropriate period and phase for both $\tau_i$ interrogators until the one that produced the second $(x_i)$ pulse has elicited an adequate response. This extended gate $L_i$ is, of course, much shorter than the interval $W_i$ would be in military systems.

It would be possible, though difficult, to replace monostable 43 with a special gate-generating circuit that would selectively interrupt the circulating pulses in the feedback loop that includes delay 45. Since the advantages of such a circuit are open to question (if an enemy should produce the first $(x_i)$ pulse, it would not help at all), it has been omitted here. Instead, the monostable switch monostable 43 ignores any further $(x_i)$ pulses that occur once its positive gate has started, until the gate ends. It is clear that the length of this gate should be selected carefully to obtain maximum benefits. The position of timing reference point ③ that offers maximum air traffic capacity is not necessarily the position that offers maximum antijamming capability.

Figure 11:
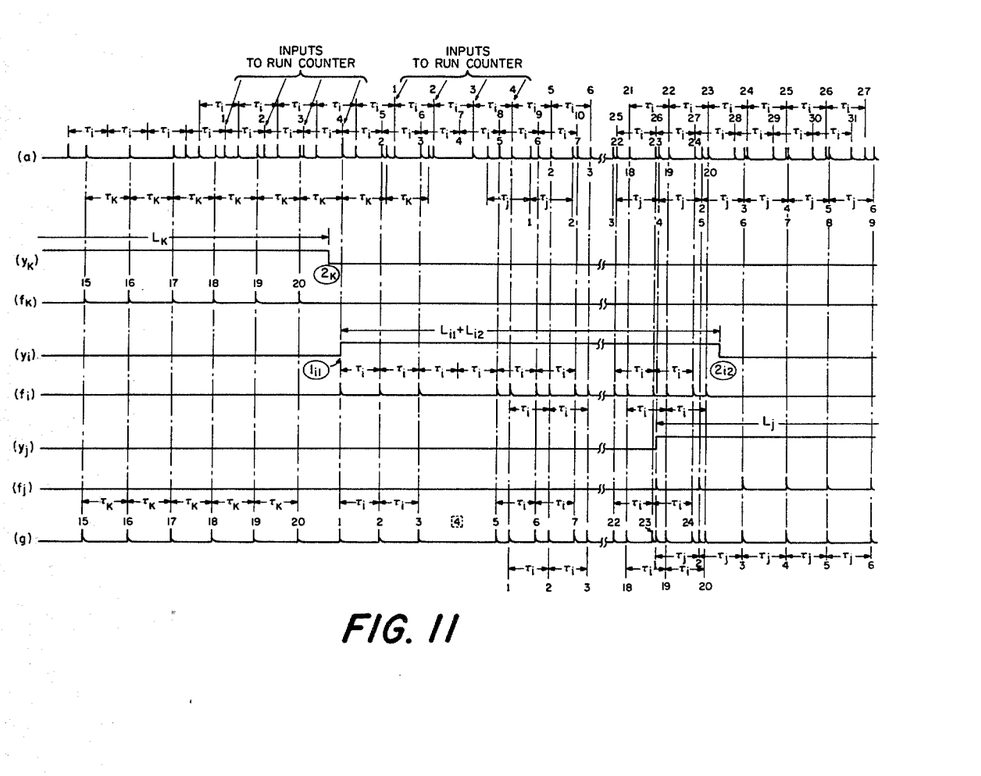

This completes the discussion of how the ROFIRP-reply-limiter circuit operates to limit the replies for interrogators operating on a single IRP. FIG. 11 shows some typical waveforms that would result if several interrogators operating IRPs tried to interrogate the same transponder simultaneously. For this figure three different periods $\tau_i$, $\tau_j$, and $\tau_k$, were chosen but two interrogators are using an IRP of $\tau_i$. Waveform (a) shows how the reply triggers coming from the transponder receiver might appear when these interrogators are interrogating the transponder simultaneously. (Note that the delays $\delta_2$ and $\delta_3$, which were greatly exaggerated in FIGS. 6 through 10, have been omitted from FIG. 11). Waveforms $(y_k)$ and $(f_k)$ show that the 15th reply to the $\tau_k$ interrogator occurs at the left side of FIG. 11. One of the $\tau_i$ interrogators starts producing reply triggers just before the 15th reply is made to the $\tau_k$ interrogator, but since the $\tau_i$ triggers are not repeated four times (in waveform (a)) no reply is elicited at first.

Replies should not be given to an interrogator until some consistency in reception of its interrogations has been achieved. If the interrogation path is poor, the reply path will be too, so nothing is gained by attempting to reply.

Waveform (a) of FIG. 11 shows the first pair of reply triggers with period $\tau_i$ as being completed shortly after the 18th reply has been transmmitted for the $\tau_k$ interrogator. The interrogator that produced these triggers is the first $\tau_i$ interrogator. The first set of interrogations at any IRP receives priority over all others until a run count of four is achieved, provided there are no breaks in the run. This priority prevents the second $\tau_i$ interrogator from achieving a run count until after the $\tau_i$ interrogator has completed its count. Note that the second $\tau_i$ interrogator produces its first input to the run counter a little more than $\tau_i$ microseconds after the first $\tau_i$ interrogator has started producing reply triggers (g). However, if there had been a break in the sequence of reply triggers from the first $\tau_i$ interrogator before it had achieved a run of four, then the other $\tau_i$ interrogator would have been given priority immediately after the break. Note that when $\tau_j \neq \tau_i$, a $\tau_j$ interrogator, since its (a) pulses go into circuit $B_j$, could cause a run count to be started while the $\tau_i$ interrogator's run count is being made.

Once the run count is achieved, any other interrogator operating on a different phase and the same $\tau_i$ can start achieving a run count. The second $\tau_i$ interrogator in FIG. 11 achieves a run count of four just after the fifth ($f_i$) reply-trigger position of the first $\tau_i$ interrogator. The fact that a reply trigger (g), the fourth, is missing in the first $\tau_i$ sequence at this point makes no difference to the run counter 37.

The interleaving of two sequences of interrogations at the same IRP will produce the effect illustrated in waveform ($y_i$) of FIG. 11. Note that the gate $L_i$ in this waveform starts when the first reply is elicited from the first interrogator that achieves a run count of four and stops only when the second interrogator has elicited an adequate number (20 in this case) of replies (see waveforms ($y_i$) and ($f_i$) in FIG. 11). This slight increase in the number of replies transmitted to an interrogator whose sequence of interrogations becomes interleaved at the transponder with a sequence from another interrogator is considered desirable to increase reliability. It is not likely to contribute much to overall traffic capacity reduction. Besides, more circuitry would be required to limit both of two interleaved sequences of interrogations to exactly the same number of replies.

The $\tau_j$-interrogator's sequence of reply triggers (a) shown in FIG. 11 happen to start at such a phase that neither of the $\tau_i$ sequences interfere with them although both are still eliciting replies. If greater differences between $\tau_i$ and $\tau_j$ are required, and if two interrogations have to be separated by larger amounts for both to be recognized, the circuits of FIGS. 2, 3, and 4 can be greatly simplified.

The ROFIRP reply-limiting technique offers the advantages gained in higher reliability and greater resistance to jamming, especially for military transponders. There is an advantage in a modification that requires changes only in transponders: The transponders that are not modified continue to operate as before. However, the interrogator-responsors that receive their replies will experience a somewhat reduced fruit (extraneous and unsynchronized replies) rate, since all modified transponders will transmit fewer replies.

Another distinct advantage of the ROFIRP reply-limiting technique is that it requires absolutely no change in the type of signals transmitted. It requires only that the interrogations be transmitted periodically.

Since ROFIRP reply limiting is not supposed to replace interrogation-sidelobe-suppression (ISLS) techniques but to supplement them, it appears likely that where ISLS is effective, any azimuth errors introduced by ROFIRP reply limiting can be corrected without great difficulty, because they will be calculable, can easily be measured, and will change only when interrogator antenna installations are changed.

The reply-limiting technique described here is based on the assumption that interrogation repetition frequencies may all be crystal controlled and none of them need be closely correlated with a primary radar prf. The technique could be used when primary and secondary radar operate from the same timing mechanism, but it becomes most effective only when IRF assignments are made to suit radar beacon or secondary radar needs. Such assignments might place undesirable restrictions on the primary radar, if the two were tied to the same timing source.

In summary, the ROFIRP method of limiting the replies that a transponder gives to each interrogator offers a way of assuring that each interrogator will elicit an adequate number of replies from each transponder without eliciting an excessive number from any. The ROFIRP method does not depend on reduced signal strength or reduced antenna beam-widths to achieve reply limiting, and it requires no change in signal format or frequencies used.

The ROFIRP method does require some new logic circuits in the transponders that use it and can be more effective if the interrogation repetition frequencies of interrogators are crystal controlled and nonsynchronous. However, this increase in complexity may be worthwhile, especially for military transponders, since use of ROFIRP reply limiting by all military transponders would make their operation more reliable, would increase their air traffic capacity and resistance to jamming, and would simultaneously reduce the total amount of fruit at any interrogator operating in the same region.

The logic circuits provided in this report for RO-FIRP reply limiting are considerably more complex than necessary. Circuit simplifications and optimum logic design can easily be made by those skilled in the art.

The foregoing description of one embodiment of the present invention has been specific and will suggest many other embodiments to those skilled in the art. For this reason, it is intended that the scope of the present invention be not limited to the foregoing description thereof, but only by the appended claims.

What is claimed and desired to be secured by Letters Patent of the United States is:

1. In a transponder receiving IFF interrogation signals, apparatus for supplying an adequate number of responses to each IFF interrogator having a fixed interrogation frequency comprising:
  means for recognizing periodic signals of an interrogator including,
    delay means,
    a first AND gate coupled to said delay means,
    counter means coupled to said first AND gate adapted to produce an output pulse upon counting a predetermined number of periodic signals;
  means for responding to said interrogator upon the deletion of said periodic interrogation signals, said responding means including means for producing a pulse having a length corresponding to said adequate number of transponder responses and a second AND gate coupled to said pulse producing means and said first AND gate; and,
  means for inhibiting responses to said interrogator after an adequate number of replies have been given to said interrogator.

2. Apparatus as recited in claim 1 wherein said inhibiting means comprises at least one monostable multivibrator and a plurality of AND gates for supplying inhibiting pulses to said recognition means.

* * * * *